(12) United States Patent  (10) Patent No.: US 8,636,569 B1
Flickinger et al.  (45) Date of Patent: Jan. 28, 2014

(54) THRESHING ELEMENT FOR HARVESTERS

(75) Inventors: Wayne T. Flickinger, Oxford, PA (US); Martin J. Roberge, Saskatoon (CA); Herbert M. Farley, Elizabethtown, PA (US); Herman A. Cease, Lititz, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/552,025

(22) Filed: Jul. 18, 2012

(51) Int. Cl.
*A01F 12/34* (2006.01)

(52) U.S. Cl.
USPC ..................................... 460/71; 460/6; 460/1

(58) Field of Classification Search
USPC ............................. 460/1, 6, 71, 110, 121, 122
See application file for complete search history.

(56) References Cited

U.S. PATENT DOCUMENTS

| | | | |
|---|---|---|---|
| 3,606,742 A * | 9/1971 | Wieneke et al. | 460/4 |
| 4,258,726 A * | 3/1981 | Glaser et al. | 460/109 |
| 5,192,245 A | 3/1993 | Francis et al. | |
| 5,779,541 A | 7/1998 | Helfrich | |
| 6,003,387 A | 12/1999 | Larson et al. | |
| 6,442,916 B1 * | 9/2002 | Pope | 56/10.2 R |
| 6,669,557 B2 | 12/2003 | Adams et al. | |
| 6,726,559 B2 | 4/2004 | Bischoff | |
| 7,074,125 B2 | 7/2006 | Ho et al. | |
| 7,096,653 B2 | 8/2006 | Shinners et al. | |
| 7,485,035 B1 | 2/2009 | Yde | |
| 7,645,190 B2 | 1/2010 | Schwinn et al. | |
| 2008/0167100 A1 * | 7/2008 | Farley et al. | 460/71 |
| 2008/0167101 A1 * | 7/2008 | Farley et al. | 460/72 |
| 2011/0320087 A1 | 12/2011 | Farley et al. | |

FOREIGN PATENT DOCUMENTS

EP 0216060 4/1987

* cited by examiner

*Primary Examiner* — Alicia Torres
(74) *Attorney, Agent, or Firm* — Patrick M. Sheldrake

(57) ABSTRACT

A threshing element includes a structure having an outside surface for threshing a crop material, and an inside surface. A body is operatively connected to a sensor. The body is secured to the inside surface of the structure, the body having a connecting feature for securing at least the body and the structure to each other. The structure is securable to a rotatable threshing rotor of a harvester threshing system. In response to operation of the threshing rotor of the harvester threshing system, the sensor outputs a signal corresponding to forces generated by contact between the outside surface of the structure and the crop material.

20 Claims, 6 Drawing Sheets

THRESHING ELEMENT FOR HARVESTERS

FIELD OF THE INVENTION

The present invention is directed to rotary threshing systems for agricultural combines or harvesters and, more particularly, to threshing elements for mounting on threshing rotors in axial flow-type combines.

BACKGROUND OF THE INVENTION

Many agricultural combines or harvesters use a rotary threshing and/or separating system. The system typically includes at least one rotor drivingly rotated within a rotor housing including a perforated concave spaced radially outwardly thereof. The rotor will often have a frusto-conical inlet end having a helical flight or flights therearound for conveying a flow of crop material into a space between the rotor and the housing. The main body of the rotor will typically have an array or layout of threshing elements, typically rasp bars, which protrude radially outwardly therefrom into the space for conveying a mat of the crop material along a helical path through the space. Rasp bars cooperate with the concave to separate larger components of the crop, namely crop residue commonly referred to as straw, which includes stalks, stems, cobs and the like, from the smaller grain and material other than grain (MOG).

Currently, research in the field of threshing systems is typically being completed empirically. That is, problems are observed, and changes are made based upon visual, horsepower (torque and speed), loss, wear, and other easily observed or measured parameters. However, during operation of agricultural combines or harvesters, very little of the reactions occurring inside of threshing systems are truly understood due to the lack of access to the system.

Accordingly, there is a need for a threshing element that at least partially addresses the problems identified above. More specifically, there is a need for a threshing element(s) that can be configured in a manner permitting threshing forces to be measured in order to optimize operation of agricultural combines or harvesters and/or identify trouble areas inside the threshing systems.

SUMMARY OF THE INVENTION

In accordance with one aspect of the present invention, threshing element includes a structure having an outside surface for threshing a crop material, and an inside surface. A body is operatively connected to a sensor. The body is secured to the inside surface of the structure, the body having a connecting feature for securing at least the body and the structure to each other. The structure is securable to a rotatable threshing rotor of a harvester threshing system. In response to operation of the threshing rotor of the harvester threshing system, the sensor outputs a signal corresponding to forces generated by contact between the outside surface of the structure and the crop material.

In accordance with another aspect of the present invention, a threshing system of a harvester includes a rotatable rotor having a plurality of threshing elements disposed along a peripheral surface of the rotor. The plurality of threshing elements have an outside surface for threshing a crop material and an inside surface. A body is operatively connected to a sensor. The body is secured to the inside surface of each of at least one threshing element of the plurality of threshing elements. The body has a connecting feature for securing at least the body and the corresponding threshing element of the plurality of threshing elements to each other. The plurality of threshing elements are securable to the rotor. In response to operation of the rotor of the harvester threshing system, the sensor outputs a signal corresponding to forces generated by contact between the outside surface of a corresponding threshing element and the crop material.

In accordance with still another aspect of the present invention, a method for optimizing operation of a harvester includes providing a rotatable rotor having a plurality of threshing elements disposed along a peripheral surface of the rotor. The plurality of threshing elements have an outside surface for threshing a crop material, and an inside surface. The method further includes providing a body operatively connected to a sensor, the body secured to the inside surface of each of at least one threshing element of the plurality of threshing elements. The body having a connecting feature for securing at least the body and the corresponding threshing element of the plurality of threshing elements to each other. The plurality of threshing elements are securable to the rotor. The method further includes measuring forces generated between the outside surfaces of corresponding threshing elements of the plurality of threshing elements and the crop material. The method further includes selectively controlling harvester operating parameters in response to the measured forces.

An advantage of the threshing element of the present invention is that it permits threshing forces to be measured for optimizing operational efficiencies of the agricultural combine or harvester and/or identifying trouble areas in the threshing systems.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
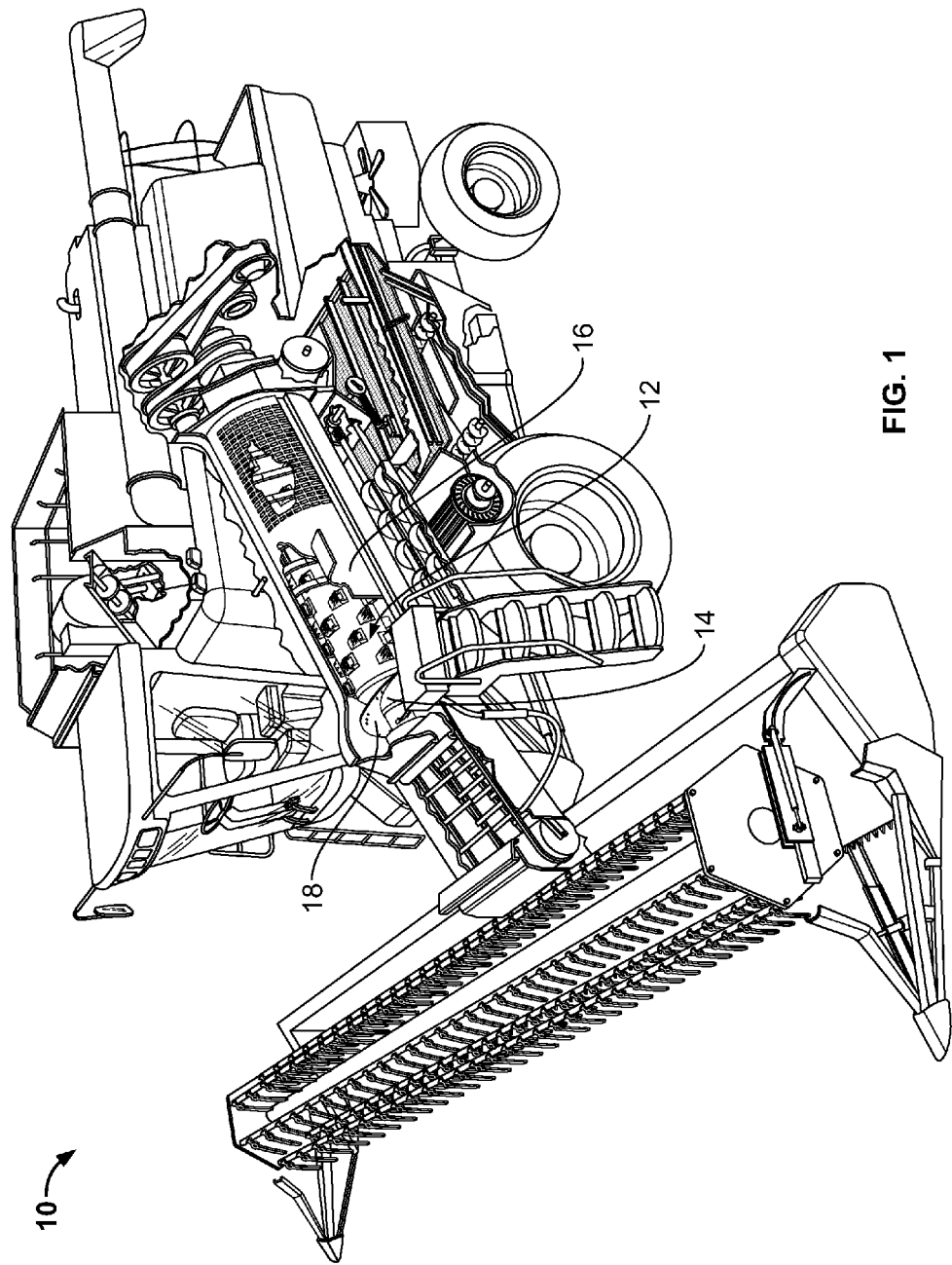
FIG. 1 shows a representative agricultural combine having a rotary threshing system.

Turning now to the drawings, FIG. 1 depicts a representative agricultural combine or harvester 10 including a harvester or rotary threshing system 12 having a threshing rotor 14 in a rotor housing 16. Among other rotary threshing systems, agricultural combine or harvester 10 may have a rotary threshing system or threshing system 12 that includes only one threshing rotor (single rotor), as shown in FIG. 1, or a threshing system that has two counter-rotating threshing rotors (twin rotor). Harvester 10 is representative of an axial flow-type harvester including one or two fore and aft extending threshing rotors, but it should be understood that it is contemplated that the invention can likewise be used with rotors of other types of combines, including, but not limited to, conventional types wherein one or more rotors of the invention will be mounted in a transverse orientation within a body of the combine.

Figure 2:
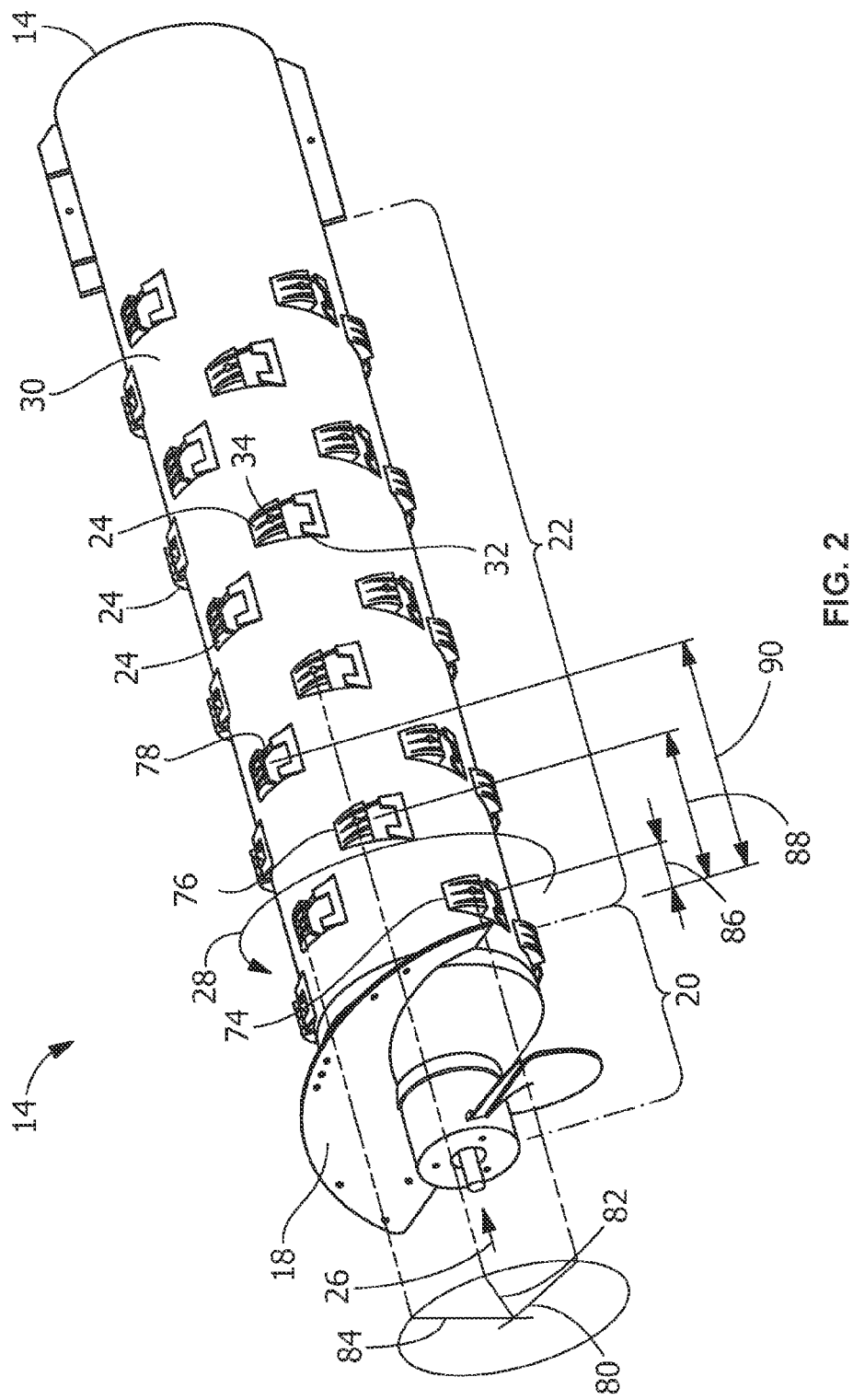
FIG. 2 shows a threshing rotor having exemplary threshing elements mounted thereon.

Referring collectively to FIGS. 1 and 2, threshing rotor 14 includes an auger flight 18 at an infeed portion 20 to transfer crop material to a threshing portion 22. Threshing portion 22 is shown having exemplary rasp bars or threshing elements 24 which are secured to threshing element mounts 32 mounted on a cylindrical peripheral surface 30 of rotor or threshing rotor 14 by a fastener 34 to thresh crop material in a threshing manner well known in the art. Typically, rasp bars or threshing elements 24 are mounted on threshing rotor 14 in a helical pattern, as shown in FIGS. 1 and 2. When viewed from the direction represented by arrow 26 (see FIG. 2), threshing rotor 14 rotates counter-clockwise during operation of rotary threshing system 12. This counter-clockwise rotation is represented by arrow 28.

Figure 3:
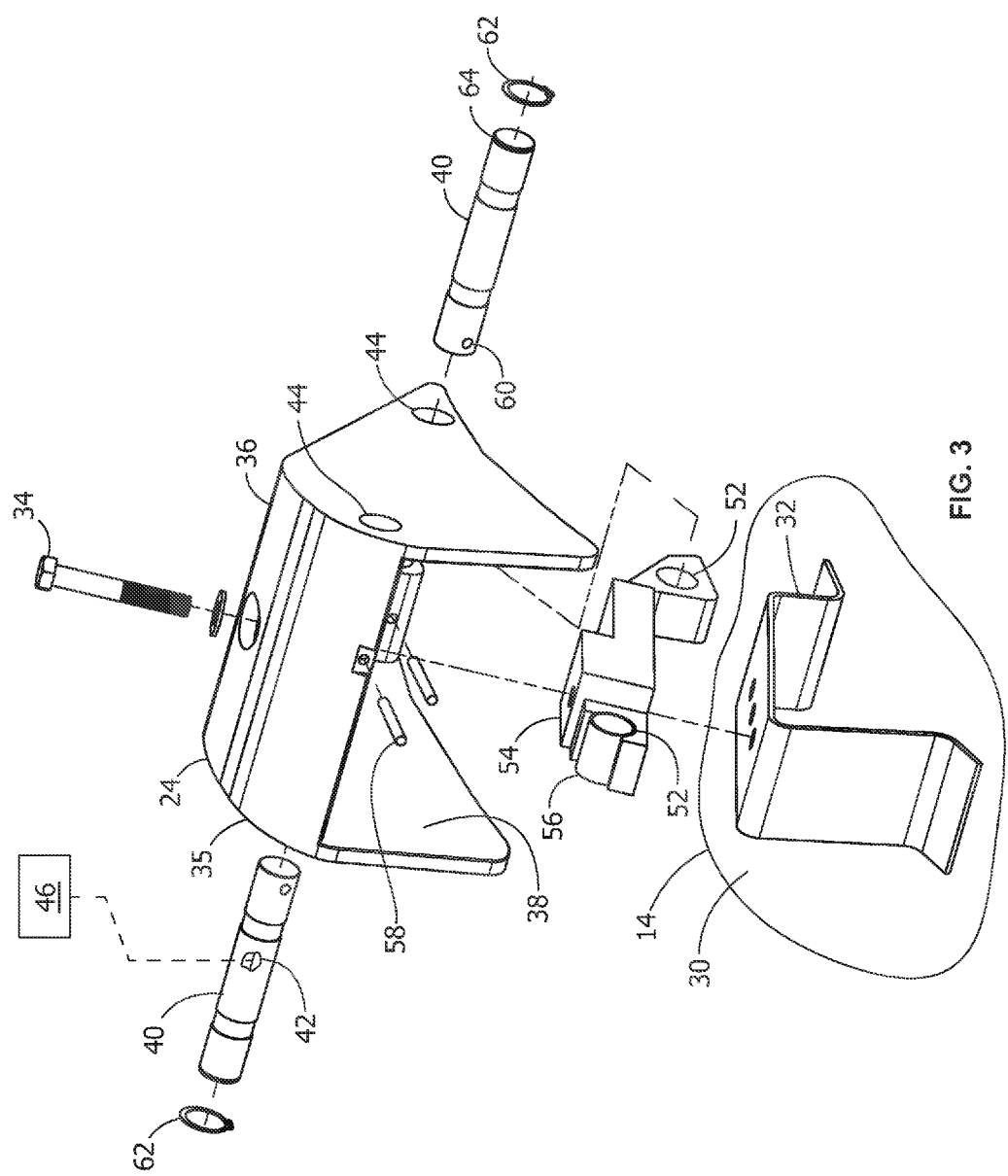
FIG. 3 is an exploded view of one of the exemplary threshing elements shown in FIG. 2.
Figure 4:
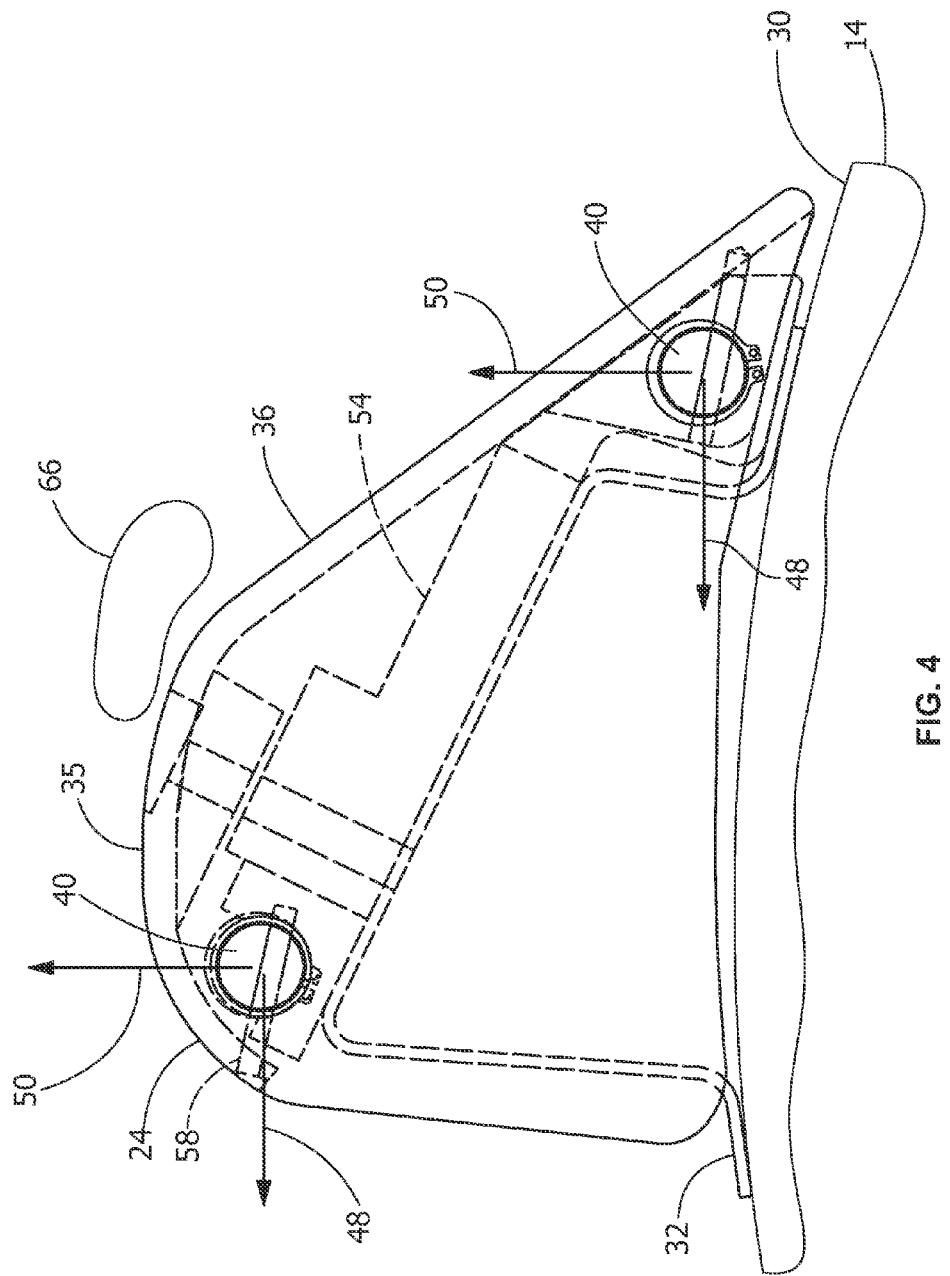
FIG. 4 is an assembled elevation view of the exemplary threshing element shown in FIG. 3.

As further shown collectively in FIGS. 3-4, threshing element 24 includes a structure 35 having an outside surface 36 for threshing a crop material 66, and an inside surface 38 facing threshing element mount 32. A body 40, such as a substantially cylindrical pin is operatively connected to a sensor 42, with body 40 secured to structure 35 and to threshing element mount 32. The term operatively connected is intended to include sensor 42 being embedded inside of body 40, as shown in FIG. 3, although in another embodiment, sensor 42 could be positioned at or near an exterior surface of body 40. In other words, when body 40 is secured to element mount 32, sensor 42 may be located at any suitable orientation and/or position relative to body 40 such that the sensor would be subjected to forces generated by crop material contacting outside surface 36 of structure 35 of threshing element 24 during operation of the rotary threshing system 12 (FIG. 1), which forces resisting the rotational movement of threshing rotor 14 and being measurable by the sensor. As shown, such forces may be oriented along axes 48, 50, correlating to respective tangential and radial force components relative to threshing rotor 14, although the forces could be oriented in other directions, if desired. In this arrangement, body 40 may contain one or more sensor(s) 42 which may be in the form of a strain gauge, such as a bi-axial strain gauge. In other embodiments, uni-axial or shear type strain gauges may be used, or any suitable kind of transducer that is calibrated to indicate forces being applied to the rasp bar.

Additionally as shown, a pair of bodies 40 operatively connected to respective sensor(s) 42 may be utilized to average the forces such as by virtue of an operative connection with a controller 46 in a known manner. For example, as a result of the operative connection between sensor(s) 42 and controller 46, such as by a wireless connection involving telemetry, or by hard wired connection using slip rings that allows the transmission of power and electrical signals from a stationary structure to a rotating structure as is also known, sensor(s) 42 may generate a signal in response to sensing a force, with controller 46 encoding the signal from sensor(s) 42. In another embodiment, a different number of bodies than two may be associated with a structure. In this arrangement, in which forces may be sensed by the sensors and conveyed in the form of a generated or output signal that is encoded by controller 46, the controller may not simply average the forces, possibly due to an arrangement of the bodies.

That is, if the bodies are arranged such that the forces subjected to the bodies are not equal, the controller could be configured to account for the arrangement of the bodies, and thus, assess the forces sensed by one or more of the bodies differently than the forces sensed by another body, such as assign different proportional values to forces from different bodies. In yet another embodiment, sensor 42 can be calibrated and deliver or generate a signal irrespective of the sensor's position. That is, signals may be generated in response to continuing changes of crop shape and resistance along the rotor 14. Stated differently, a correlation of forces could be established along the threshing rotor 14 versus the crop. The operator could also establish a target value for the actual performance of the rotor 14 so the controller 46 would try to optimize and maintain that target value during harvesting. In another embodiment, the operator may be provided a warning (e.g., audio, video, tactile) associated with crop stagnation or near blockage of the threshing system.

As further shown FIGS. 3 and 4, bodies 40 are inserted through respective aligned openings 44 formed in structure 35, as well as openings 52 formed in an isolator 54. That is, an outer surface of each body 40 is secured to the respective inside surface of opening 44 of structure 35. As shown in FIG. 3, isolator 54, which is disposed between threshing element mount 32 of threshing rotor 14 and body 40 may be utilized to help isolate vibration associated with operation of the harvester or rotary threshing system 12, and providing more accurate data. As further shown FIG. 3, isolator 54 may not be composed of a single block of material, such as a sleeve 56 that is secured within the larger body of isolator 54. In one embodiment, body 40 may incorporate the effect of isolator 54, such that a separate isolator is not required. As further shown in FIGS. 3 and 4, a mechanical fastener 58, such as a threaded fastener may be used to engage a mating feature 60, such as an opening for a recess formed in body 40 to secure body 40 to structure 35. Alternately, or in addition to mechanical fastener 58, a mechanical fastener 62, such as a retaining ring may be secured in a groove 64 formed in body 40 exterior of structure 35 to secure body 40 in structure 35.

Figure 5:
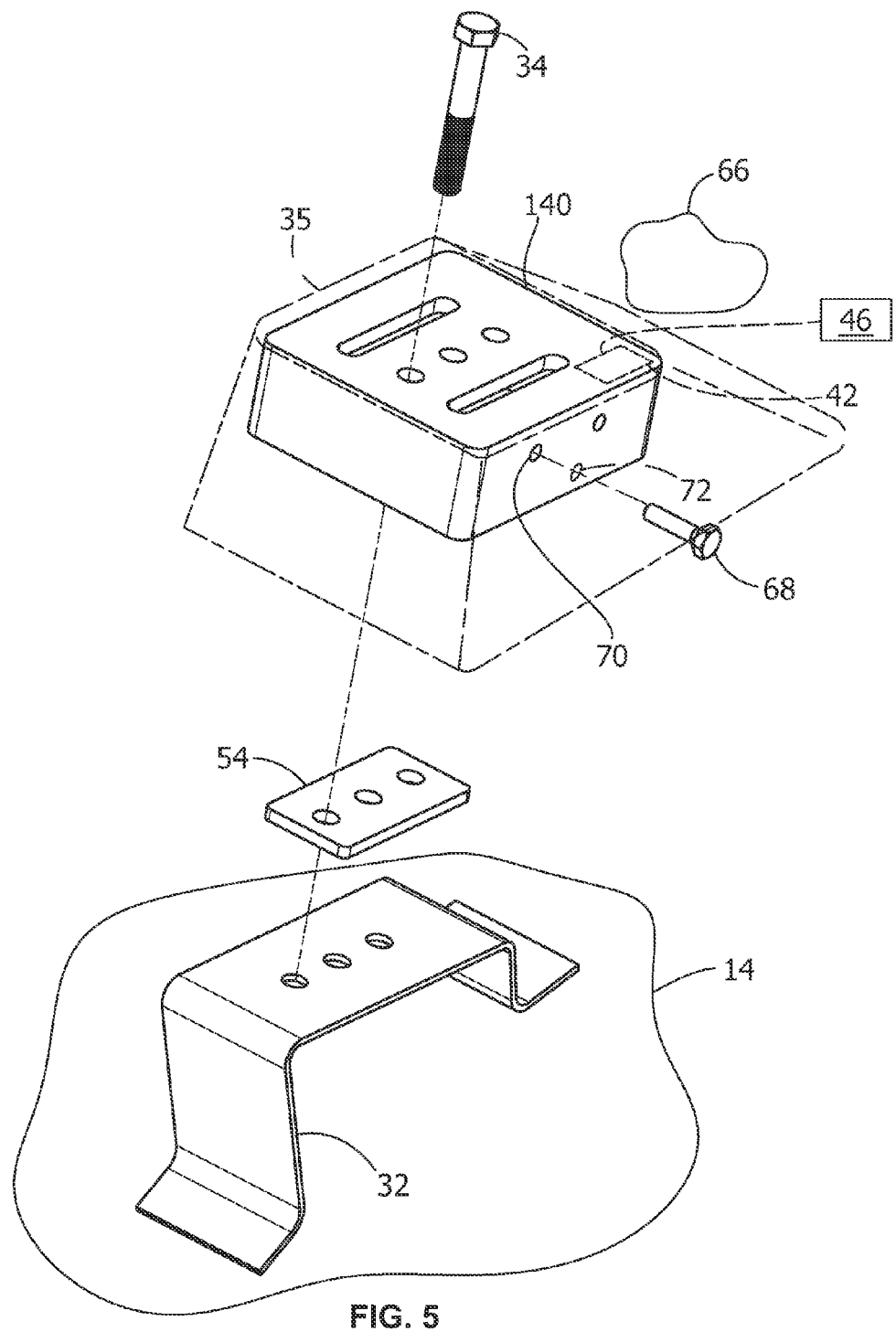
FIG. 5 is an exploded view of another exemplary threshing element shown in FIG. 2.

As shown in FIG. 5, a body 140 is secured to an isolator 54 and threshing element mount 32 by a fastener 34 extending through mutually aligned openings formed in the body, isolator and threshing element mount. Body 140 includes sensor 42 that may be located in several positions in body 140 (only one position shown in FIG. 5) and operatively connected to controller 46 as previously discussed. As shown, a connecting feature securing body 140 and structure 35 to each other includes a fastener 68 inserted through aligned openings 70, 72 formed in respective body 140 and structure 35. In this arrangement, sensor(s) 42 operatively connected to body 140 sense loading forces generated between crop material 66 and structure 35.

Figure 6:
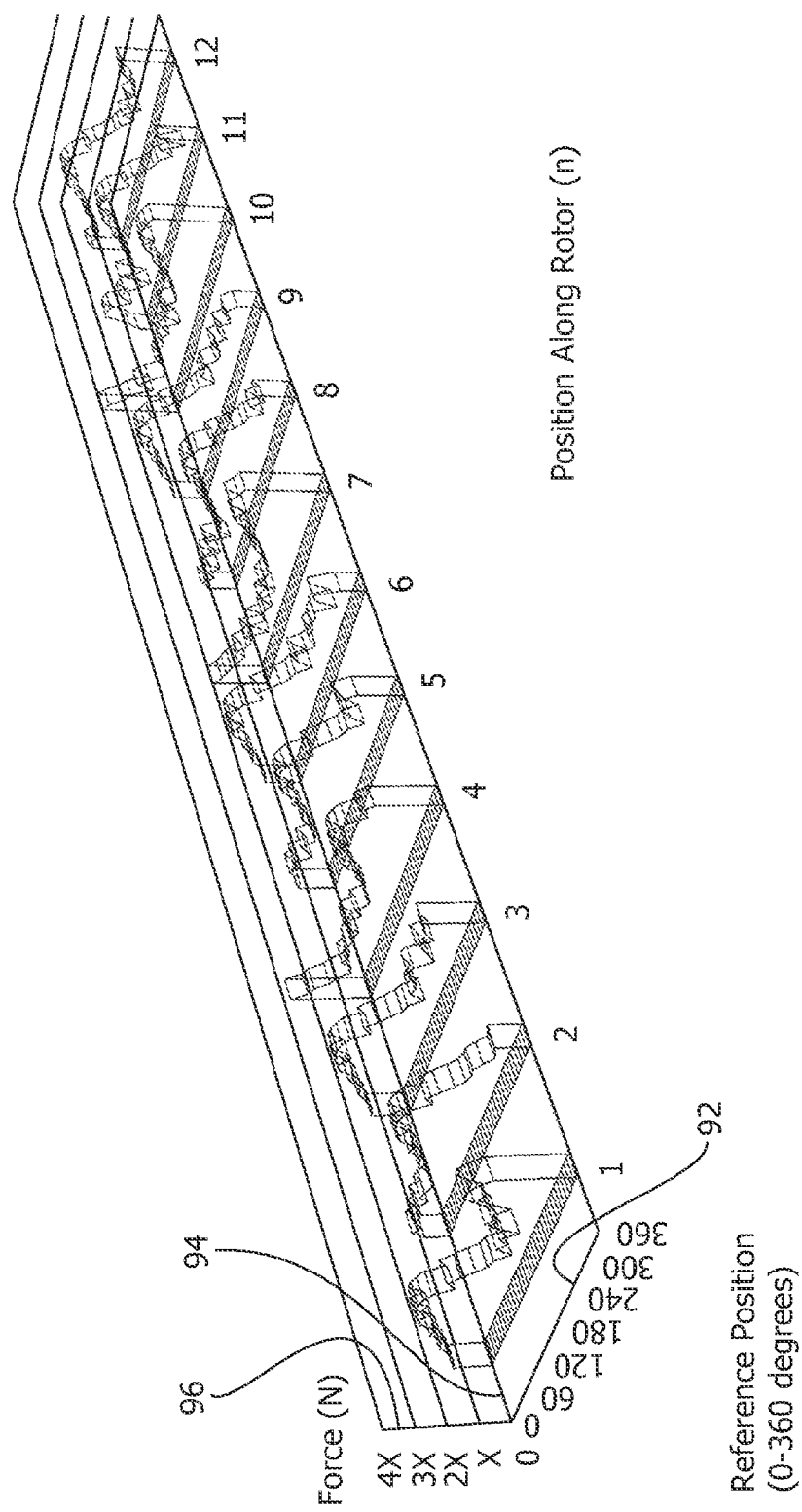
FIG. 6 is a three dimensional representation of forces generated during operation of an exemplary threshing system.

As shown in FIG. 2, exemplary sensor-equipped structures or instrumented structures such as identified as sensor-equipped or instrumented structures 74, 76, 78 may be utilized to provide three dimensional force monitoring relative to threshing rotor 14 of rotary threshing system 12, such as shown in FIG. 6. For example, sensor-equipped or instrumented structures 74, 76, 78 correspond to respective angular orientations or angular positions 80, 82, 84 along the longitudinal axis of the threshing rotor 14, such as measured in degrees as shown in FIG. 2, and further corresponding to axis 92 of three dimensional graph in FIG. 6.

For example, angular orientations or angular positions 80, 82, 84 permit to determine a reference position along the surface of threshing rotor 14. In addition, sensor-equipped or instrumented structures 74, 76, 78 correspond to respective longitudinal or axial distances or axial positions 86, 88, 90, such as (n) positions, along and parallel to the center axis of threshing rotor 14 and further corresponding to axis 94 of three dimensional graph in FIG. 6. The combination of angular orientations or positions 80, 82, 84 respective longitudinal or axial distances or axial positions 86, 88, 90 permits easy determination of the position of the sensor-equipped or instrumented structures 74, 76, 78 as shown in three dimensional graph in FIG. 6. Further, sensor-equipped or instrumented structures 74, 76, 78 correspond to measured forces, such as measured in Newtons, between the sensor-equipped or instrumented structures and crop material generated during operation of the threshing system and further corresponding to axis 96 of three dimensional graph in FIG. 6.

In other words by indexing data against angular rotation, a map of forces can be created for this section of the threshing rotor in which sensor-equipped or instrumented structure resides during its rotation in the harvester threshing system. This map can help identify troubled areas inside the threshing systems by identifying regularities in crop flow. It is to be understood that the three dimensional graph shown in FIG. 6 includes data from many more sensor-equipped structures than exemplary sensor-equipped or instrumented structures 74, 76, 78. Data provided by the sensor-equipped or instrumented structures during operation of the harvester threshing system can be stored in a memory device, sometimes referred to as a receiver.

In addition, by virtue of the use of novel sensor-equipped or instrumented structures not previously used in threshing systems of harvesters, such as sensor-equipped or instrumented structures 74, 76, 78, it has become possible to identify and compile three dimensional mapping of crop flow inside of the threshing chamber of the harvester. It has been found, that as a general matter and even for different crops, maintaining measured forces generated between crop material and structures 35 between predetermined ranges corresponds to optimized harvester operation. For example, it has been found that for several crops, it is desirable to maintain the forces at a relatively constant threshold range, as forces less than the threshold range tend to result in inadequate threshing, and forces greater than the threshold range tend to damage grain and/or increase the amount of power required by the harvester to operate. Therefore, in response to measuring forces generated between the outside surfaces of corresponding threshing elements in the crop material, harvester operating parameters may be selectably controlled, such as by employing a feedback loop with a controller. Such operating parameters include, but are not limited to rotor speed, concave clearance, vane angle, throughput (increasing/decreasing speed of harvester), cutting height of crop material and monitored grain quality (i.e., the percentage grain versus foreign matter). Grain quality can be measured by use of a camera or sensing device of the harvested grain, and can be up to about 99.9 percent, and typically above 98 percent.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A threshing element comprising:
a structure having an outside surface for threshing a crop material, and an inside surface;
a body operatively connected to a sensor;
the body secured to the inside surface of the structure, the body having a connecting feature for securing at least the body and the structure to each other, the structure securable to a rotatable threshing rotor of a harvester threshing system; and
wherein in response to operation of the threshing rotor of the harvester threshing system, the sensor outputting a signal corresponding to forces generated by contact between the outside surface of the structure and the crop material.

2. The element of claim 1, wherein the sensor is a strain gage.

3. The element of claim 1, wherein the connecting feature is a mechanical fastener insertable through aligned openings formed in the body and the structure.

4. The element of claim 1, wherein an outer surface of the body is the connecting feature relative to the structure.

5. The element of claim 1, further comprising an isolator disposed between the body and the threshing rotor.

6. The element of claim 5, wherein the body includes the isolator.

7. The element of claim 5, wherein the body is a substantially cylindrical pin insertable through openings formed in the structure and the isolator.

8. The element of claim 7, wherein a mechanical fastener secures the pin in an installed position.

9. The element of claim 8, wherein the pin includes an opening to receive the mechanical fastener.

10. The element of claim 8, wherein the pin includes a groove to receive the mechanical fastener.

11. The element of claim 1, wherein the generated forces comprised force elements directed radially and tangentially relative to the threshing rotor.

12. A threshing system of a harvester comprising:
a rotatable rotor having a plurality of threshing elements disposed along a peripheral surface of the rotor, the plurality of threshing elements having an outside surface for threshing a crop material and an inside surface;
a body operatively connected to a sensor;
the body secured to the inside surface of each of at least one threshing element of the plurality of threshing elements, the body having a connecting feature for securing at least the body and the corresponding threshing element of the plurality of threshing elements to each other, the plurality of threshing elements securable to the rotor; and
wherein in response to operation of the rotor of the harvester threshing system, the sensor outputting a signal corresponding to forces generated by contact between the outside surface of a corresponding threshing element and the crop material.

13. The system of claim 12, wherein the generated forces comprise force elements directed radially and tangentially relative to the rotor.

14. The system of claim 12, wherein the sensor and a controller are operatively connected, the controller receiving and encoding the signal from the sensor.

15. The system of claim 12, wherein the sensor and controller have a wireless connection therebetween.

16. The system of claim 15, wherein the connection involves telemetry.

17. The system of claim 13, wherein the received and encoded signals permit three dimensional force monitoring relative to the rotor.

18. A method for optimizing operation of a harvester comprising:
providing a rotatable rotor having a plurality of threshing elements disposed along a peripheral surface of the rotor, the plurality of threshing elements having an outside surface for threshing a crop material, and an inside surface;

providing a body operatively connected to a sensor, the body secured to the inside surface of each of at least one threshing element of the plurality of threshing elements, the body having a connecting feature for securing at least the body and the corresponding threshing element of the plurality of threshing elements to each other, the plurality of threshing elements securable to the rotor;

measuring forces generated between the outside surfaces of corresponding threshing elements of the plurality of threshing elements and the crop material; and selectively controlling harvester operating parameters in response to the measured forces.

19. The method of claim 18, wherein selectively controlling harvester operating parameters includes maintaining the measured forces between a predetermined range.

20. The method of claim 18, wherein the harvester operating parameters include the group consisting of rotor speed, concave clearance, vane angle, throughput, cutting height of crop material, and monitored grain quality.

\* \* \* \* \*